United States Patent [19]

Pugsley

[11] 3,956,583

[45] May 11, 1976

[54] IMAGE REPRODUCTION SYSTEMS PROVIDING REPRODUCTION AT A FINER PITCH THAN INPUT SCANNING

[75] Inventor: Peter C. Pugsley, Pinner, England

[73] Assignee: Crosfield Electronics Limited, London, England

[22] Filed: Apr. 30, 1975

[21] Appl. No.: 573,334

[30] Foreign Application Priority Data
May 3, 1974 United Kingdom............... 19592/74

[52] U.S. Cl. .......................... 178/6.6 R; 178/6.6 B; 178/6.7 R; 358/78
[51] Int. Cl.² ....................... H04N 1/06; H04N 1/40
[58] Field of Search........... 178/6.7 R, 6.6 R, 6.6 A, 178/6.6 B; 358/75, 77, 78

[56] References Cited
UNITED STATES PATENTS

| | | | |
|---|---|---|---|
| 3,541,245 | 11/1970 | Wilby............................. | 178/6.7 R |
| 3,770,888 | 11/1973 | de Voss et al.................... | 178/6.6 B |
| 3,878,559 | 4/1975 | Pugsley................................ | 358/78 |

Primary Examiner—Raymond F. Cardillo, Jr.
Attorney, Agent, or Firm—Cushman, Darby & Cushman

[57] ABSTRACT

In a system for producing screened images, for each set of image-representing signals derived from one rotation of an input scanner cylinder, $n$ sets of screen-representing densities are derived corresponding to screen densities of parallel tracks each of which has a width which is a fraction of the screen pitch. The set of image-representing signals for a line of the image is modified $n$ successive times as a function of the $n$ respective sets of screen-representing densities and each of the $n$ sets of screen-modified image-representing signals is applied in turn to modulate a single output element in an output scanner in which the scanning beam scans the image-reproducing area at a pitch that is $n$ times finer than that of the input scanner.

9 Claims, 1 Drawing Figure

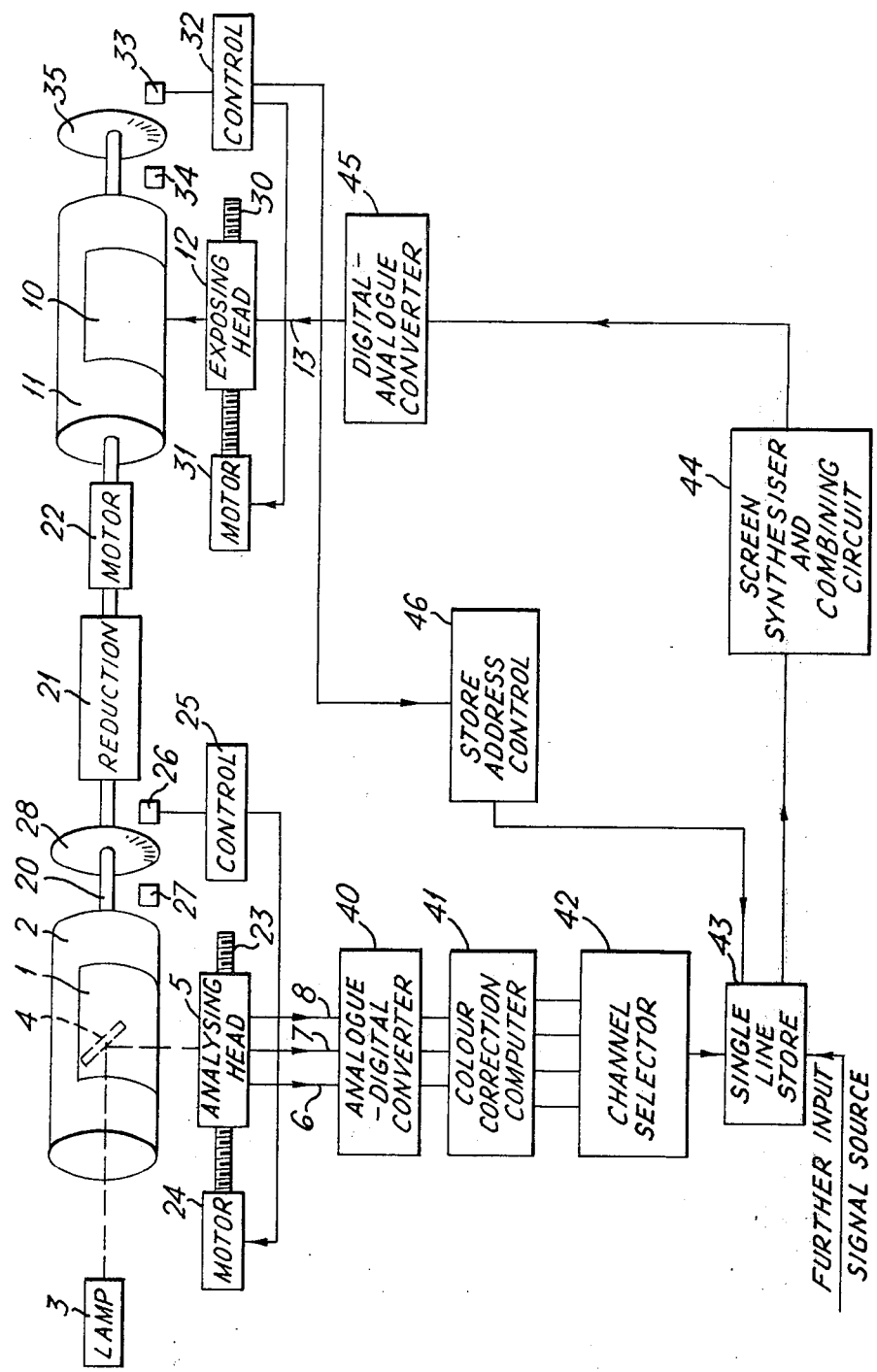

IMAGE REPRODUCTION SYSTEMS PROVIDING REPRODUCTION AT A FINER PITCH THAN INPUT SCANNING

This invention is concerned with an image-reproducing system of the kind in which an image to be reproduced is scanned to derive an electric signal representing the density of successively scanned elements of the original, or a set of electric signals representing the densities of colour components of the scanned elements of the original. Typically, after signal processing to control the output tone variation and, in the case of colour signals, to compensate for colour non-linearities in the process, to introduce "editorial" colour changes as required and to generate a black printer signal (where necessary), the signals are used in the reproduction of a printer plate, or a set of colour separations in the case of a coloured original. Usually, the image to be reproduced is mounted on a cylinder and the films to be exposed or other output surfaces to be treated are mounted on a further cylinder, the two cylinders rotating at the same speed, and it is in fact convenient to have a common drum with the analysing cylinder section at one end and the exposing cylinder section at the other end. It will be appreciated that to ensure that the surfaces are scanned over the whole of their area, relative axial movement between the analysing head and the image to be reproduced and between the exposing head and the film to be exposed is required and this is usually achieved by mounting the analysing and exposing heads on lead screws, or on a common lead screw, driven in synchronism with but at a much lower rate than the rotation of the cylinders.

In some cases, enlargement is required in the reproduction. In this case, the lead screws supporting the analysing and exposing heads are driven at different speeds, or have different pitches, so that the speed of movement of the heads is different. However, enlargement in the circumferential sense is achieved by using a drum of greater diameter and consequently the analysing cylinder section and the exposing cylinder section continue to rotate at the same speed and are advantageously mounted on a common shaft.

It is known for forming screened reproductions to form each screen dot in a number of sections, by scanning the output surface at a resolution such that each screen dot is formed by a number of parallel tracks; a screen dot may be completed by a single multi-track pass of the exposing head or, if the screen is angled with respect to the tracks, may be completed in two multi-track passes. An image signal, common to all the light sources, is superimposed on the individual screen signals at the separate light sources. As before, the analysing and reproducing cylinder sections are rotated relative to their heads at the same speed, a complete multi-track line of the reproduction being completed in one revolution of the reproducing cylinder section, in the same time as the analysis of an image line in a revolution of the analysing cylinder section.

According to the present invention, we provide an image-reproducing system in which: image-representing signals are derived by parallel-line scanning at a first line pitch of an image-analysing area receiving the image to be reproduced; a set of image-representing signals corresponding to a line of the image to be reproduced is modified n successive times as a function of n successive sets of screen-representing densities, respectively, the n sets of screen-representing densities corresponding to screen densities of parallel tracks, each of which has a width which is a fraction of the screen pitch; and in which each of the n sets of screen-modified image-representing signals is applied in turn to modulate a single output element in an output scanner, the single output element providing a beam that is incident on an image-reproducing area thereof and the output scanner having means whereby the beam scans the image-reproducing area at a pitch that is n times finer, in relation to the image-reproducing area than the pitch of the input scanner in relation to the area of the image analysed thereby.

Generally, each line of the image to be reproduced will be scanned once in the analysing scanner and the resulting set of signals will be stored, for subsequent extraction n successive times and n successive combinations with n respective sets of screen-track signals.

The treatment (for example the exposure or engraving) of one line section in each revolution of the output cylinder, with a single light source unit, reduces the optical complexity of the arrangement. Additionally, it does not necessarily produce a penalty in speed because the separation of the analysing and output cylinders permits the output cylinder to be rotated at a very high speed, much higher than could be used for the input cylinder because of the signal/noise ratio limitations which exist for the latter. This additional speed can make up for the increased number of revolutions required to complete one picture pitch of the reproduction.

The store may be of such a capacity that it can hold the signals for the whole picture before the signals are extracted for application to the output scanner. However, it may be more advantageous to employ simultaneous running of the input and output cylinders and to use a store having a capacity which is just large enough for a single scanning line plus a small additional buffering capacity to cope with slight errors of synchronisation between the two cylinders. In such a case, each stored signal is erased immediately after it has been used n times and is replaced by a fresh signal from the input scanner.

The system described above is particularly advantageous where a number of input signals are to be combined to form a signal for modulating the output surface, in that the storage may be arranged to receive all these input signals. An example of such a requirement is when two or more pictures or areas of text are to be arranged on a single page to be exposed or otherwise treated as a whole, so that in a single revolution of the output cylinder one line of each of the several different pictures or text areas is scanned.

When a high speed of rotation is used for the output cylinder, a laser light source can be employed with advantage.

A further technique which may be employed when a high speed of relative rotation is required is the use of a rotating optical unit with a stationary output cylinder. This optical unit can be arranged within the cylinder, the films to be exposed being placed either around the inner wall of the cylinder or else, if the cylinder is transparent, around its outer wall. An example of such apparatus is described in my application Ser. No. 361,804 of May 18, 1973 now U.S. Pat. No. 3,875,587.

In order that the invention may be better understood, an example of a system embodying the invention will now be described with reference to the accompanying drawing.

In the drawing, a transparency 1 to be exposed is wrapped around a transparent cylinder 2 and is illuminated by the light from a lamp 3 after reflection by a mirror 4 on the axis of the cylinder. It will be appreciated that the drawing is diagrammatic and that in practice the illuminating optical system would include various condenser lenses, for example. The reflected light passes through the transparency to an analysing head 5 which provides on lines 6, 7 and 8 signals representing the colour-component values of the scanned element of the transparency. Generally, the filters in the analysing head will be red, green and blue and the signals on lines 6, 7 and 8 will represent the cyan, magenta and yellow printer channels.

A light-sensitive surface 10 to be exposed is wrapped around a cylinder 11 and receives light from an exposing head 12 controlled by a signal on line 13.

To achieve the relative motion between the analysing head and the transparency, the drum 2 is mounted on a shaft driven, through a reduction drive 21, by a motor 22 and the analysing head is mounted on a lead screw 23 driven by a motor 24, the rotation of which is goverened by a control unit 25 receiving signals from a photo-electric pick-up 26. The pick-up 26 receives light from a source 27 through a slotted disc 28. The cylinder 11 is driven directly by the motor 22 to provide rotation of the light-sensitive surface 10 with respect to the exposing head and the exposing head is mounted on a lead screw 30 driven by a motor 31, the rotation of which is governed by a control unit 32 receiving signals from a pick-up 33 which receives light from a source 34 through a slotted disc 35.

Thus, the analysing head scans the cylinder 2 in a helical line and the transparency 1 is scanned in a series of parallel lines. The light-sensitive sheet 10 is subjected to a similar scanning but at a much higher speed of rotation and with a much smaller axial pitch between the scanning lines.

The colour-component signals are applied to an analogue-digital converter 40 and the resulting digital signals are applied to a colour correction computer 41 which may be of known kind and forms no part of the present invention. The corrected signals, together with a black printer signal derived in the unit 41, are applied to a channel selector 42 which connects one of the outputs of the computer 41 to a store 43 which has a capacity of slightly more than one line.

As explained above, the extraction of the signals for a single line from the store is repeated several times before that line is erased, the number of times depending upon the pitch of the scanning lines in the reproducing section of the apparatus and the extraction being under the control of a store address control unit 46, in turn controlled by the disc 35 through the unit 32.

To produce a screened image, the picture signal from the store 43 is applied to a screen synthesiser and combining circuit 44 in which a screen signal is superimposed on the image signal to form a resultant which is applied to the exposing head. This screen signal will be different for each repetition of a single line of signals from the store. The resultant is applied through a digital-analogue converter 45 to the exposing head 12. An example of a suitable screen synthesiser is described in application no. 545,179 of Richard M. Gascoigne, Jan. 29, 1975.

If desired, the outputs of other image-signal sources can be applied to the signal line store, to be combined with the image 1 in the reproduction 10. Where the other signal source represents text, it will generally be desirable to arrange that when the text is being extracted from the store, the screen synthesiser and combining circuit is by-passed.

In the above description, we have referred to an exposing head and to exposing a light-sensitive surface 10. However, in an alternative system embodying the invention, a laser forming part of the exposing system could direct its beam on to an output surface 10 such that it is affected by the heat of the laser to form a printer; as an example, the output surface 10 might include a metal film which is evaporated where the laser beam is incident upon it, but other forms of heat treatment of the output surface are possible.

I claim:

1. A method of image-reproduction comprising the steps of:

deriving image-representing signals by parallel-line scanning at a first line pitch of an image-analysing area receiving the image to be reproduced;

deriving n sets of screen-representing densities corresponding to screen densities of parallel tracks each of which has a width which is a fraction of the screen pitch;

modifying a set of the derived image-representing signals corresponding to a line of the image to be reproduced n successive times as a function of the said n sets of screen-representing densities, respectively;

and applying each of the n sets of screen-modified image-representing signals in turn to modulate a single output element in an output scanner, the single output element providing a beam that is incident on an image-reproducing area thereof and the output scanner having means whereby the beam scans the image-reproducing area at a pitch that is n times finer, in relation to the image-reproducing area than the pitch of the input scanner in relation to the area of the image analysed thereby.

2. A method in accordance with claim 1, comprising applying signals derived by the said parallel-line scanning to a store and extracting the signals for each line n successive times.

3. An image-reproducing system for effecting a screened reproduction of an image in which each screen line is reproduced as a number of independent parallel screen tracks, the system comprising:

an image-analysing scanner for deriving electrical signals representing the image densities of successively scanned elements of an image to be reproduced in an image-analysing area of the said scanner, the scanned elements being in parallel lines at a first predetermined pitch;

an output scanner having means including a single output element whereby a scanning beam is incident at a surface at which the image is to be reproduced and means for generating relative movement between the surface itself and the point of incidence of the scanning beam on the surface, whereby the said point of incidence is scanned over an image-reproducing area of the said surface in a succession of parallel tracks at a second predetermined pitch, the said pitch of the scanning tracks of the output scanner being finer by a multiple n in relation to the image-reproducing area, than that of the input scanner in relation to the image-analysing area;

a store for storing signals derived from the input scanner;

means for generating $n$ sets of screen-representing values corresponding to the screen density values for $n$ parallel tracks, each of which has a width which is a fraction of the screen pitch;

means for successively modifying a set of signals derived from the input scanner and corresponding to a line of the image to be reproduced at the said first pitch as a function of each of the said $n$ sets of screen-representing values;

and means for extracting signals from the store and applying to the output scanner screened image-representing signals corresponding to each track in turn of the screened image to be reproduced, at the said second pitch.

4. A system in accordance with claim 3, in which the store is insufficient to hold more than the signals corresponding to two lines of the image to be reproduced, the signals corresponding to each line being erased when they have been extracted n times from the store.

5. A system in accordance with claim 3, in which the store receives input information from a number of different sources.

6. A system in accordance with claim 3, in which the output element of the output scanner is a laser.

7. A system in accordance with claim 3, comprising an input cylinder for receiving the image to be reproduced and an output cylinder for receiving a surface on which the image is to be reproduced, the output cylinder being stationary in operation and the output scanner further including a rotating optical unit within the output cylinder arranged to sweep the output beam around the inner surface of the cylinder.

8. A system in accordance with claim 3, including an input cylinder for receiving the image to be reproduced and an output cylinder for receiving a surface on which the image is to be reproduced, one set of track signals being extracted from store in each revolution of the output cylinder.

9. A system in accordance with claim 8, in which the two cylinders are driven by a common motor, the input cylinder being driven at a rate of rotation which is n times less than the rate of rotation of the output cylinder.

* * * * *